United States Patent [19]
d'Alayer et al.

[11] Patent Number: 5,675,451
[45] Date of Patent: Oct. 7, 1997

[54] MULTI-TYPE CASSETTE LOADING MECHANISM OPERABLE TO SENSE CASSETTE TYPE

[75] Inventors: Stephane M. d'Alayer, Genappe; Michel C. G. Mortier, Ans, both of Belgium

[73] Assignee: Staar S.A., Brussels, Belgium

[21] Appl. No.: 616,292

[22] Filed: Mar. 15, 1996

[30] Foreign Application Priority Data

Apr. 5, 1995 [BE] Belgium .................. 95 00314

[51] Int. Cl.$^6$ .................................................. G11B 5/008
[52] U.S. Cl. .................................................. 360/94
[58] Field of Search .......................... 360/92, 94, 96.5, 360/96.6

[56] References Cited

U.S. PATENT DOCUMENTS

| | | | |
|---|---|---|---|
| 4,546,396 | 10/1985 | Schatteman | 360/96.5 |
| 5,153,867 | 10/1992 | Inoue | 369/77.2 |
| 5,172,284 | 12/1992 | Ohshima | 360/94 |
| 5,231,553 | 7/1993 | Weber et al. | 360/96.5 |
| 5,331,484 | 7/1994 | Klos-Hein et al. | 360/96.5 |
| 5,345,351 | 9/1994 | Krohn | 360/96.5 |
| 5,420,732 | 5/1995 | Scholz et al. | 360/96.5 |
| 5,434,727 | 7/1995 | Kage et al. | 360/96.5 |

FOREIGN PATENT DOCUMENTS

| | | |
|---|---|---|
| 0406943 | 1/1991 | European Pat. Off. . |
| 0514983 | 11/1992 | European Pat. Off. . |
| 0516217 | 12/1992 | European Pat. Off. . |

*Primary Examiner*—A. J. Heinz
*Attorney, Agent, or Firm*—Leydig, Voit & Mayer, Ltd.

[57] ABSTRACT

A cassette loading mechanism operable with first and second type similar size magnetic tape cassettes such as analog cassettes (CC) and digital cassettes (DCC) which are parallelepiped cassettes having a discontinuity on an external surface; the cassette loading mechanism having: a sensing mechanism which distinguishes between the types of cassettes, when correctly presented, and which blocks movement to the fully inserted position of cassettes mis-presented upside down or with sides inverted; the sensing mechanism including a cassette-type-sensing lever movable from an initial position to first and second positions representing, respectively, the type of cassette responsive to engagement with a surface discontinuity distinguishing the type of cassette correctly presented and inserted in the housing, and a movable slider member which is normally blocked against movement by the sensing lever, and prevents mis-presented cassettes being moved to the fully inserted position, and which is allowed to move with correctly presented cassettes to the fully inserted position when the sensing lever is moved from its initial position upon engagement with a correctly presented cassette.

20 Claims, 2 Drawing Sheets

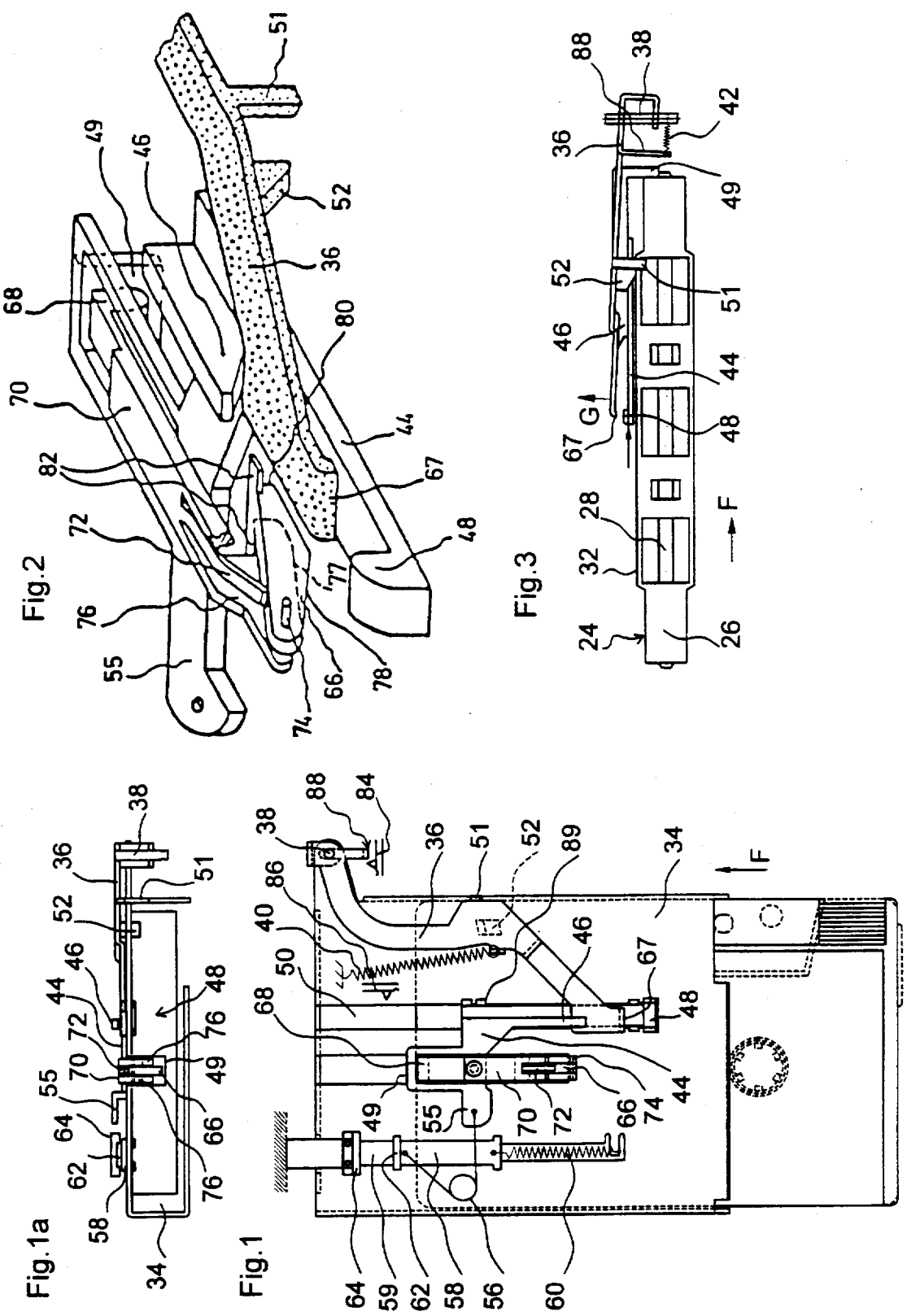

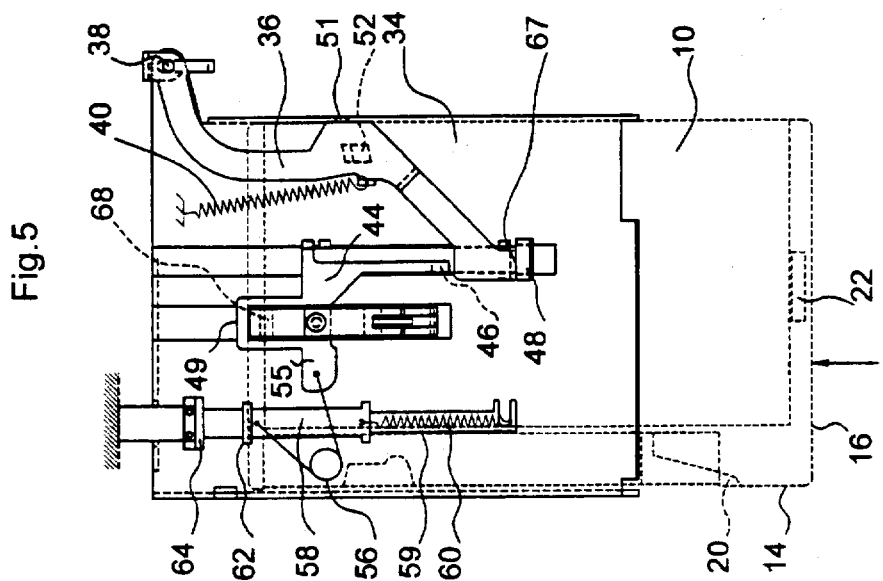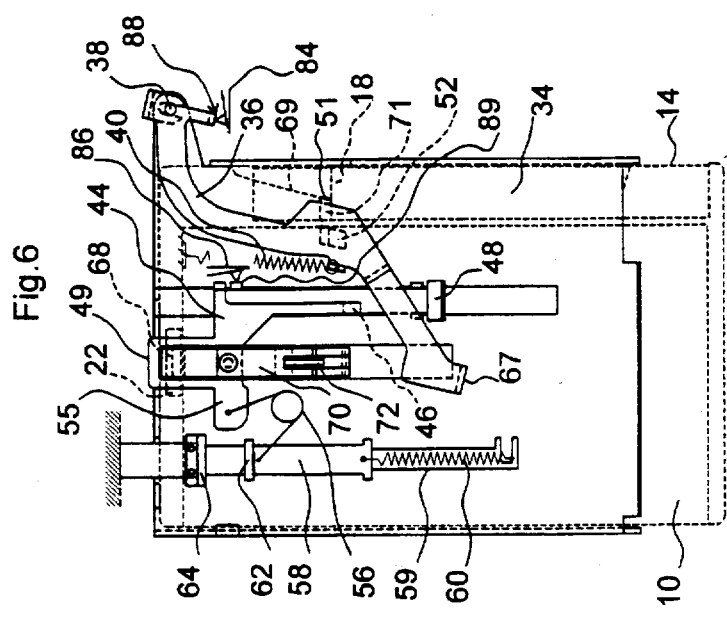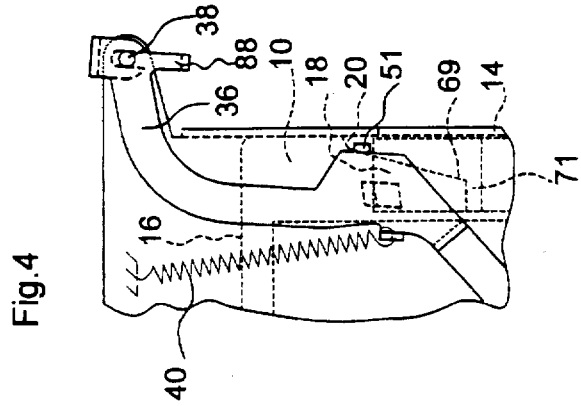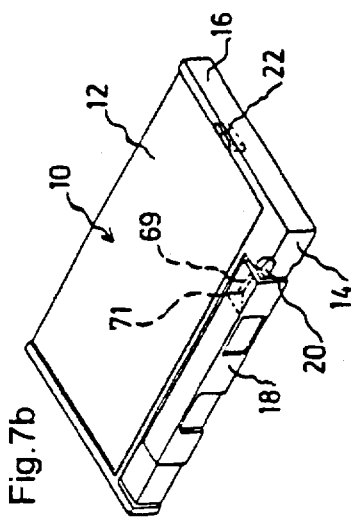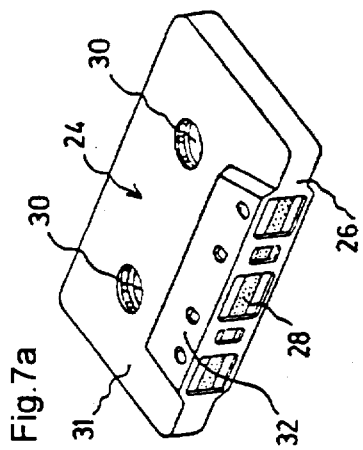

MULTI-TYPE CASSETTE LOADING MECHANISM OPERABLE TO SENSE CASSETTE TYPE

The present invention relates to loading mechanisms for playback/recording apparatus and, more particularly, to loading mechanisms for cassettes or cartridges enclosing information carriers such as magnetic tape. It concerns, more particularly, loading mechanisms which receive and guide cassettes to their fully inserted positions, when correctly presented, and which block movement of cassettes to their fully inserted positions when mis-presented.

BACKGROUND OF THE INVENTION

In the field of magnetic tape cassettes, a cassette known as the digital compact cassette or DCC has been recently launched on the market and ensures storage of audio information in a digital format. The DCC cassette, aimed at entering the market for the well-known compact analog cassette or CC which has been widely available for many years, has a housing quite similar to the housing of the compact cassette so that new playback/recording apparatus launched on the market can operate with both types of cassettes for recording and/or playback of information and thus can ensure a smooth and economic transition between those two formats. Both type cassettes have similar size parallelepiped housings, however, the cassettes have distinguishing discontinuities on an external surface in that the digital cassette has a crevice next to a shutter slidable along one long side to selectively open and close head access windows and reel drive access openings in only one face; the analog cassette has a thickened region proximate one long side with head access windows and reel drive access openings in both faces.

Due to the similarity between both cassette housings, it is possible to develop a common loading mechanism; nevertheless it is imperative to detect, before setting in operative position, the type of cassette inserted by the user as several mechanical or electromechanical recording, playback, and drive elements are constructed differently and must be set in accordance with the type of inserted cassette before cooperation with the cassette.

Further, the new digital cassette in addition to having only one operative face with reel drive access openings has only one operative direction and, as it is of a perfectly parallelepiped shape, the user, especially in case of car applications, may rather easily introduce it into a loading mechanism incorrectly, for instance, upside down or with the sides inverted, with the risk of damaging playback/recording heads, which are very fragile, and/or tape drive elements, or blocking the loading system, making the unit then useless.

U.S. Pat. No. 5,172,284 discloses a device sensing the type (format) of the inserted cassette but, on one hand, it blocks the insertion movement only near its end and thus very often the user is likely to force the cassette further inward as the user does not readily understand that the cassette has been mis-presented; on the other hand, this device is applicable only to a loading mechanism wherein cassettes are inserted long-side first. Such type loading mechanisms are appropriate for household units but totally inappropriate for car units wherein cassettes are desirably loaded narrow-end first because of reduced space requirements.

U.S. Pat. No. 5,420,732 relates to a cassette loading system wherein cassettes are inserted narrow-end first but, if the disclosed device discriminates an analog cassette from a digital one, this is achieved only when the cassette is correctly inserted by the user. Because digital cassettes are of a perfect parallelepiped shape, the risk of an incorrect insertion is very high and in such case, the disclosed device just considers any incorrectly inserted digital cassette as an analog one, something which is not only an error but also a potential source of numerous defective operations and thus of damage to or breakdown of the unit. Further, this device is implemented with a large number of levers and springs which require precise manufacturing and careful assembly operations and may face problems of reliability, especially in the case of units mounted in cars.

SUMMARY OF THE INVENTION

The principal aim and object of the present invention is to overcome such drawbacks of previous proposed devices by providing simple, reliable and easy to implement devices which detect the type of inserted cassette without any ambiguity or error so that, first, only correctly inserted cassettes can be loaded and, second, electrical and mechanical playback, recording and/or drive elements can be selected to correspond to the type of cassette inserted by the user.

A second aim of the invention is to provide devices requiring only a very limited number of parts so as to provide high reliability and reduced manufacturing cost.

A third aim of the invention is to provide devices requiring only a very limited space so that they can be easily incorporated in car units, in which available space is greatly limited.

An additional aim of the invention is to provide devices which block the movement of mis-presented; i.e. incorrectly inserted, cassettes as soon as possible and in any case before any powered movement of the cassettes toward the operative position so that the user is not inclined or tempted to force the loading mechanism.

In carrying out the invention, the loading mechanism according to the invention comprises a mechanism operable with first and second type similar size parallelepiped magnetic tape cassettes having long sides, one long side having windows, narrow ends, and distinguishing discontinuities on an external surface, the cassette loading mechanism comprising a support housing into which either type cassette may be inserted end-first and which receives and guides either type cassette to move in a longitudinal path in a cassette inserting plane to a fully inserted position, when correctly presented and inserted wherein the one long side of either type cassette with windows is located to receive a tape recording/playback head system corresponding to the type of cassette, a sensing mechanism which distinguishes between the types of cassettes, when correctly presented, and which blocks movement to the fully inserted position of cassettes mis-presented, the sensing mechanism including a cassette-type-sensing lever movable from an initial position to first and second positions corresponding respectively to the type of cassette responsive to engagement with distinguishing surfaces of a cassette correctly presented and inserted in the housing, and a movable slider member which is normally blocked against movement by the sensing lever and prevents mis-presented cassettes being moved to the fully inserted position, and which is allowed to move with a correctly presented and inserted cassette to the fully inserted position when the sensing lever is moved to either of its first and second positions upon engagement with a surface discontinuity distinguishing the type of cassette.

Additional aims and objects of the invention will appear from the detailed description of a most preferred embodiment, given hereafter, and to which modifications can be brought without departing from the scope of the invention, and in which:

BRIEF DESCRIPTION OF THE DRAWINGS

FIG. 1 is a top view of a loading mechanism incorporating the present invention;

FIG. 1a is a front view of the loading mechanism shown in FIG. 1;

FIG. 2 is a perspective view, at a larger scale, of a sensing mechanism which is a component of the mechanism shown in FIG. 1;

FIG. 3 is a partial side view of elements of the sensing mechanism of this invention, after actuation by a correctly inserted analog cassette;

FIG. 4 is an enlarged fragmentary view of a portion of FIG. 1 upon the start of the insertion of a correctly inserted digital cassette;

FIG. 5 is a view similar to FIG. 1 and shows the sensing mechanism blocking the movement of a digital cassette not correctly inserted by the user;

FIG. 6 is a view similar to FIG. 1 and shows the loading mechanism after a correctly inserted cassette, herein shown as a digital cassette, reaches a fully inserted position;

FIGS. 7a and 7b respectively represent schematically and in perspective view an analog cassette and a digital cassette.

DETAILED DESCRIPTION OF THE BEST MODE

For clarity, only the elements necessary for an understanding of the invention have been represented in the above-mentioned figures.

As illustrated in FIGS. 7a and 7b, two different type cassettes which may be used with the loading mechanism of this invention have similar size parallelepiped shells; the first type, which is illustrated in FIG. 7b, is a digital cassette 10 (DCC) which has opposite faces 12, long sides 14 and narrow ends 16, one long side 14 having windows for head access, a normally closed slidable shutter 18 which selectively opens and closes the windows, and reel drive access openings in only one face which in this instance is the bottom face which is not visible in this figure, and a long-side crevice 20 next to one end of the shutter 18 and near one narrow end 16 which is the leading end when the cassette is correctly inserted narrow-end first into the loading mechanism. Further, the digital cassette 10 has a recess 22 in the top face next to the end of the cassette which is intended as the leading end when this digital type cassette 10 is correctly inserted into the loading mechanism. The other type cassette, shown in FIG. 7a, is the analog cassette 24 (CC) which has one long side 26 with windows for head access to tape 28 within the cassette 24, reel drive access openings 30 in both faces, and a thickened region 32, which is a surface discontinuity, proximate said one long side 26. Thus, the first and second type cassettes have distinguishing external surface discontinuities such as the crevice 20 which distinguishes the first type cassette and the thickened region 32 which distinguishes the second type cassette.

Now turning to the figures, the loading mechanism, according to the invention, comprises support members forming a cassette support housing 34 for receiving a cassette, when inserted narrow-end first in a cassette inserting plane, and for guiding the cassette along a horizontal cassette path toward an inserted position. When the cassette reaches a partially inserted position, shown in FIG. 3 with a compact analog cassette 24, preferably the support housing 34 is then powered by a source such as an electric motor (not shown), which moves the housing 34 and thereby the cassette in the cassette inserting plane further along the horizontal cassette path to a fully inserted position, shown in FIG. 6 with a digital cassette, and then vertically downward to its operative position wherein the cassette is located to cooperate with a tape head and reel drive system. Most preferably, with an apparatus provided with a loading mechanism as shown, when correctly presented and inserted, both type cassettes are oriented with the window-provided long side on the right side of the cassette for cooperation with tape heads likewise on the right side of the loading mechanism, as viewed from the front as shown in FIG. 1a. When the digital cassette is correctly presented, the narrow end 16 near the recess 22 is the leading end, such that the face with the recess near the leading end is on the top and the reel drive access openings are on the bottom of the cassette. It should be recognized that with this arrangement the reel drive spindles for both type cassettes stand beneath the cassette inserting plane so as to enter the reel access openings in both type cassettes as each is dropped downward by the loading mechanism, but the arrangement may be modified as desired. It will be recognized that the apparatus must be provided with tape head and reel drive systems which correspond to both type cassette, CC and DCC, in both mechanical and electrical operation to drive the tape at appropriate speeds and read or record signals according to their respective format. For example, with digital cassettes, the recorded information is in digital format and the tape speed is controlled according to data recorded on the tape and read by heads as the tape is moving; with analog cassettes, the recorded information is in analog format and the tape is driven at a constant speed by capstans and pinch rollers. By distinguishing between the types of cassettes, the loading mechanism is also operable to select the tape head and reel drive system which corresponds to the type of cassette loaded by the loading mechanism. For further detailed description of a cassette loading mechanism with a housing providing horizontal and vertical cassette movement to an operative position, and of a playback/recording head and reel drive system for both analog and digital cassettes, suitable for use with the loading mechanism of this invention, reference may be made to commonly assigned U.S. Pat. No. 4,546,396 and copending patent application Ser. No. 08/377,824 which are hereby incorporated by reference.

Referring now to FIGS. 1, 2 and 3, in keeping with the invention, the loading mechanism includes a sensing mechanism which distinguishes between the types of cassettes, when correctly presented to the loading mechanism, and which blocks movement along the cassette path of cassettes mis-presented upside down or with sides inverted. To this end, the sensing mechanism comprises a sensing lever 36 on the right side of the loading mechanism immediately above the cassette path mounted for pivotal movement in horizontal and vertical planes such that the sensing lever 36 can simultaneously swing and pivot through small distances around a fixed axis provided by a shaft 38 fixed to the housing. Resilient means such as first and second tension springs 40, 42 act on the sensing lever 36 which is held in an initial position (FIG. 1) by the springs.

Cooperating with the sensing lever 36 is a slider member 44 which includes two upwardly projecting abutments 46, 48, one such abutment 46 being at the rearward end of the slider member 44 and serving as a restraining member with a forwardly facing inclined edge which restrains the sensing lever 36 against lateral (clockwise) swinging movement in a horizontal plane in the direction toward the cassette under the urging of force produced by the first tension spring 40 and thereby holds it in its initial position; force produced by the second tension spring urges the sensing lever in a downward direction to its initial position which is next to the slider member 44 as shown in FIG. 2.

In keeping with the invention, the slider member 44 which is L-shaped has a tab 49 which is struck from a laterally extending leg such that it projects downward into the cassette path; the slider member is slidably mounted for longitudinal movement along the cassette path in a slot 50 in the housing 34 upon engagement with the tab 49 by a leading end of a cassette which is inserted into the housing 34. This slider member 44 bears at its forward end the other upward projecting abutment 48 which is longitudinally aligned with and engaged by the sensing lever 36 when the sensing lever is in its initial position, so as to be blocked against longitudinal movement (FIG. 2), to prevent a cassette being moved along the cassette path to the fully inserted position. For cooperating respectively with distinguishing surfaces of a cassette of the first (DCC) or second (CC) types, thereby indicating which type cassette has been inserted in the housing 34, the sensing lever 36 carries downwardly projecting elements including a lateral stud 51 and a forwardly facing cam 52. To resiliently control the sliding movement of the slider member 44, the extremity of its laterally extending leg 55 is attached to a hair spring 56, the other extremity of which is attached to a slidable support 58 which can also be translated on and with respect to the housing 34 in a slot 59. This slidable support 58 is also acted on by a resilient spring 60 attached to the housing 34 and bears at its opposite end a projection 62 which cooperates with a hook 64 mounted on a spring blade fixed to the frame of the unit.

In the initial position of the sensing lever 36, the inclined face on the rearward abutment 46 on the slider member 44 by acting on the sensing lever 36 limits its pivoting in a clockwise direction. As a result, when no cassette is inserted in the housing 34, all elements are in the position shown in FIGS. 1, 1a and 2, and the lateral stud 51 of the sensing lever 36 stands out of the cassette path.

When a cassette is inserted in the support housing 34 its leading end bears against the tab 49 of the slider member 44 which projects downwardly into the cassette path as seen in FIG. 3.

When the inserted cassette is an analog cassette 24 (FIG. 7a) and is correctly inserted by the user (FIG. 3), its thickened region 32 located proximate the long side with windows for tape head access (and access for drive elements for the magnetic tape, FIG. 7a) comes into contact with the cam 52 on the sensing lever 36 which, as a result, is moved upward (FIG. 3) in a vertical plane from its initial position in the direction of the arrow G. The sensing lever 36 pivots upward against the force applied by the second resilient spring 42 a sufficient distance so that its forward end 67 clears the forward abutment 48 on the slider member 44. As a result, the slider member 44 is allowed to move longitudinally, and the slider member 44 undergoes the translation movement imparted to the cassette by the user, because the cassette pushes the tab 49 along the cassette path in the direction of the arrow F (see FIGS. 1 and 3) until the cassette reaches a partially inserted position. The lateral stud 51 on the sensing lever 36 continually bears on the lateral long side 26 of the cassette which, in the instance of an analog cassette, does not present any discontinuity (FIGS. 3 and 7a) and thus the sensing lever 36 cannot swing horizontally around the shaft 38. Simultaneously, a first hook 66 (FIG. 2) resiliently supported by the slider member 44 penetrates the forward reel drive access opening 30 (FIG. 7a) provided in the top of the shell of the analog cassette 24 and, accordingly, the cassette 24 and the slider member 44 are connected for movement together along the cassette path toward the fully inserted position of the cassette.

Upon further movement along the cassette path, the anchoring point of the hair spring 56 acting on the slider member comes close to and then overtakes its anchoring point on the slidable support 58. When this occurs, the slider member 44 and thus the cassette undergoes the influence of the hair spring 56 which pushes them together toward the back of the support housing 34 while, by reaction, the other end of the hair spring 56 pushes the slidable support 58 toward the front of the support housing 34. All those elements are now set in the position shown in FIG. 6.

Should an analog cassette 24 be mis-presented or incorrectly inserted by the user, that is to say with its thickened region 32 on the left-hand side, then the sensing lever 36 can neither swing horizontally nor pivot vertically upwardly as the lateral stud 51 lies against the long side wall of the cassette which does not offer any discontinuity for the lateral stud 51 and the top of the cassette shell does not have a thickened region for cooperation with the cam 52 on the sensing lever 36. According to this aspect of the invention, an analog cassette 24, when mis-presented, is blocked against movement to the partially inserted position while a substantial portion of the cassette shell projects from the front of the support housing 34 so that a user can readily grip and remove the cassette from the support housing 34 and is not tempted to push the cassette into the support housing 34 with the risk of jamming or breaking components. Accordingly, the abutment 48 at the forward end of the slider member 44 engages the forward end 67 of the sensing lever 36 which blocks movement of the abutment 48 and thus the slider member 44 cannot be translated toward the back of the support housing 34. Therefore, the cassette cannot be moved along its path in the support housing 34 and the user, immediately realizing that no such further movement is possible, will instinctively remove the cassette for reinserting it correctly.

Should the user insert in the support housing 34 a digital cassette 10 (FIG. 7b) correctly presented (FIG. 4), the lateral stud 51 borne by the sensing lever 36 will be located just in front of the crevice 20 in the long side 14 of the digital cassette 10 next to the shutter 18 and near the narrow leading end 16 (see FIG. 7b) and thereby positioned for actuating the shutter 18 which, when closed, protects accidental access to the magnetic tape and, when opened, allows access of the playback/recording heads and drive elements (FIG. 7b) when the cassette is in the operative position of the apparatus. Simultaneously, the leading narrow end 16 of the cassette comes into contact with the tab 49 on the slider member.

Upon further action of the digital cassette 10 (in this example) on the tab 49 of the slider member 44, the rear abutment 46 moves slightly backwards allowing the sensing lever 36 to swing clockwise around the shaft 38, as the lateral stud 51 enters the long side crevice 20 and moves along the inclined profile 69 of the crevice 20 to its end 71. The forward end 67 of the sensing lever 36 then laterally clears the forward abutment 48 on the slider member 44. Simultaneously, a second hook 68 resiliently supported on the slider member 44, enters the top face recess 22 provided only at the intended leading end 16 of the shell of the digital cassette 10 (FIG. 7b), thus connecting the digital cassette 10 and the slider member 44 for movement together. Such connecting, by the first and second hooks 66, 68 between both types of cassettes and the slider member 44, is provided so that further insertion movement of a cassette can be powered by a motor. Further, when a cassette is ejected, following a recording or playback operation, the support housing 34 is moved upward to the cassette inserting plane, (preferably by power supplied by a motor, not shown) to separate the cassette from the reel drive spindles and the recording/playback heads, and then the cassette housing and cassette are moved toward the front of the apparatus to carry the cassette to a fully ejected position, similar to the initial loading position, where a substantial portion of the cassette projects from the front of the housing 34. During the ejection operation, cassettes of both type are connected for movement along the cassette path with the slider member 44 of the loading mechanism and the housing 34 by one of the hooks 66, 68 which resiliently penetrate either an opening 30 (CC) or a recess 22 (DCC) thereby resiliently holding the cassette in the housing 34. The cassette is finally located with a substantial portion projecting from the front of the housing 34 so that a user can easily grip the end of the cassette and remove it from the housing 34. The hooks 66, 68 by resiliently penetrating cassettes, gently hold them from accidently falling out of the housing 34, when in the final ejected position, which is highly desirable particularly in car installations.

More particularly, as shown in FIG. 2, the first cassette engaging hook 66 has a specific shape, while the second hook 68 has a rather standard profile. The hooks 66, 68 are supported by a member 70 carried by the laterally extending leg 55 of the slider member 44 which is preferably made from a resilient material; one end of the hook support member 70 is provided with a tongue 72 struck from the material which engages the first hook 66 carried at the forward end of the support member 70. The hooks 66, 68 are carried at the extremities of the hook support member 70 and are supported such that the hooks 66, 68 individually exert only a slight resilient downward force against an engaged cassette. As shown, the end of the second hook 68 at the rearward end of the hook support member 70, which cooperates with the relatively narrow recess 22 provided only in the top face 12 next to the leading end 16 of a digital cassette 10, is V-shaped so as to slide on said top face 12 upon insertion of a digital cassette 10 and then penetrate said recess 22. Upward and downward movements of the first hook 66 are controlled by the resilience of the material of the hook support member 70.

As an analog cassette 24 is thinner than a digital cassette 10 in the central region, upon insertion of an analog cassette 24 in the support housing 34, the lower end of the first hook 66 stays clear of the top face 31 of the analog cassette shell.

The first cassette engaging hook 66 is pivotally supported by a pin 74 from lateral fixed flanges 76. The first hook 66 has a front and rear profile 78, 80 while the flanges 76 have a profile 77 allowing insertion or removal of a digital cassette 10; the first hook 66 pivots around an axis provided by the pin 74 within the fixed flanges 76. The resilient tongue 72, in a preferred embodiment, integrally molded with the hook support member 70 bears on the movable hook 66 to gently urge it clockwise downwards, towards the cassette inserted into the support housing 34; said clockwise movement is limited by the lateral tabs 82 provided nearby its rear profile 80 and abutting against the fixed lateral flanges 76.

The movable hook 66 has a front profile 78 shaped so as to allow insertion or removal of a digital cassette 10 while the rear profile 80 of the hook 66 is somewhat tilted in order to cooperate with the reel drive access opening 30 in an analog cassette 24. When a digital cassette 10 is inserted, because it is thicker than an analog cassette 24 in its central region, its top face 12 cooperates with the front profile 78 and, as a result, the movable hook 66 pivots counterclockwise around the pin 74 and allows the digital cassette 10 to be inserted in or removed from the support housing 34.

Should an analog cassette 24 be inserted in the support housing 34, because it is thinner than a digital cassette 10 in its central region, the movable hook 66 is also slightly pivoted counter-clockwise but, under the influence of the tongue 72, it is pivoted clockwise as soon as the analog cassette reel drive access opening 30 has come to the level of the rear profile 80. Upon such pivotal movement, the rear profile of the movable hook 66 penetrates the reel drive access opening 30, thus resiliently connecting the slider member 44 to the analog cassette 24. When the analog cassette is to be removed by the user from the support housing, then the hook 64 is slightly forced upwards against the resilience of the tongue 72 and the hook 66 clears the recess 30. Once the cassette has been removed, the support member 70 and tongue 72 reset the hook assembly in its inoperative position.

When a digital cassette 10 is removed from the support housing 34, because of its profile, the movable hook 66 does not enter the recess 22 because its curvature is much larger than the width of the recess 22 and thus this hook 66 does not prevent or restrain a digital cassette from being translated (FIG. 5).

Further insertion of the digital cassette 10 while the lateral stud 51 stays almost immobile ensures opening of the shutter 18 of the digital cassette 10. As a result, access to the magnetic tape is possible, and simultaneously the sensing lever 36 further rotates clockwise as the lateral stud 50 follows the profile 65 of the crevice until reaching its end 66 (FIGS. 4 and 6) to keep the shutter 18 in its full open position.

As for the analog cassette 24, upon further translation of the cassette and the slider member 44, the anchoring point of the hair spring 56 on the slider member 44 comes near and then overtakes its anchoring point on the slidable support 58 and, as a result, the slider member 44 and the analog cassette 24 are both pushed toward the back end of the support housing 34 under action of the hair spring 56 while the slidable support 58 is pushed toward the front end.

Both the support housing 34 and the digital cassette 10 are then in the position shown in FIG. 6.

Should the digital cassette 10 be mis-presented by the user, for instance, either upside down or with the shutter 18 on the left hand side, or back end first instead of the intended leading end 16 first; the sensing lever 36 cannot pivot around its supporting shaft 38 as the lateral stud 51 does not meet with any long side crevice. Further, since the digital cassette 10 fails to include a thickened region specific to the analog cassette 24, the cam 52 is not engaged and thus the sensing lever 36 does not pivot upward.

As a result, the front end 67 of the sensing lever 36 remains located in-between the forward and rear abutments 46, 48 on the slider member 44, thus restraining it and the cassette from being translated (FIG. 5). Accordingly, the support housing 34 remains immobile and the user is immediately made aware that the cassette is incorrectly inserted.

The loading mechanism of this invention ensures completely safe operation as any cassette, whether analog or digital, which is not correctly inserted, cannot be pushed further inside the support housing 34 and it further safely and accurately distinguishes, without any risk of error, an analog cassette 24 from a digital cassette 10. This may be accomplished by various means, preferably by detectors such as two switches 84, 86 which are actuated to represent an analog cassette 24 and a digital cassette 10, respectively, and their correct insertion. For this purpose, the switches 84, 86 are actuated to first and second states representing the first and second type cassettes respectively, herein shown represented by first and second positions of the sensing lever 36 and the slider member 44, when either a first or second type cassette is moved to the fully inserted position. As will be clear from the foregoing description, with an analog cassette 24 the sensing lever 36 will be pivoted vertically upward to a first raised position responsive to engagement of the cam 52 by the thickened region 32 on this first type cassette 24, and with a digital cassette 10 will be swung horizontally to a lateral second position responsive to engagement of the stud 51 in the long-side crevice 22 of this second type cassette. While the vertical and lateral first and second positions of the sensing lever 36 represent the first and second type cassettes, respectively, as herein shown these first and second positions are not relied on solely for indicating the type of cassette inserted in the loading mechanism. Instead, according to this aspect of the invention, the first and second type cassettes are distinguished by certain states of the two switches 84, 86 located on the frame of an apparatus provided with the loading mechanism of this invention.

To this end, the first switch 84 which is located on the frame laterally adjacent a tab 88 on the back end of the sensing lever 36, is actuated by the tab 88 upon horizontal swinging movement of the sensing lever 36 to the first lateral position when a digital cassette 10 is inserted in the housing 34, and remains disabled upon vertical pivotal movement of the sensing lever 36 to the second raised position when an analog cassette 24 is inserted in the housing 34. The second switch 86 which is located on the frame adjacent the edge of the slider member 44 is actuated by a boss 89 on the slider member 44 responsive to sliding movement of the slider member 44 to a back position in the housing 34 (FIG. 6) when either type cassette 10, 24, correctly presented, is inserted in the housing 34 and moved to the fully inserted position.

Therefore, the actuated state of the second switch 86 while the first switch 84 remains disabled represents an analog cassette 24 correctly presented and in the fully inserted position in the housing 34; the actuated state of both switches 84, 86 represents a digital cassette 10 correctly presented and moved to the fully inserted position in the housing 34.

The switches 84, 86 are preferably connected in control circuits (not shown) including the drive motors and recording/playback electronic circuitry such that actuation of the switches 84, 86 to one of the above described states is operable to select a tape recording/playback head and reel drive system corresponding to the type of cassette indicated by the state of the switches, in an apparatus provided with the loading system of this invention.

Further, by being implemented with only simple and very few elements, a loading mechanism constructed according to the invention is highly reliable in operation and has a long life.

We claim:

1. A cassette loading mechanism operable with first and second type similar size parallelepiped cassettes enclosing an information carrier and having at least one face with reel drive access openings, one long side with windows, and narrow ends; the first and second type cassettes having a distinguishing discontinuity on an external surface;

said cassette loading mechanism comprising:

a support housing into which either type cassette may be inserted end-first and which receives and guides either type cassette to move in a longitudinal cassette path in a cassette inserting plane to a fully inserted position, when correctly presented wherein the one long side of either type cassette with windows and a face with reel drive access openings are located to receive a corresponding tape recording/playback head and reel drive system of an apparatus provided with the loading mechanism;

a sensing mechanism which distinguishes between the types of cassettes, when correctly presented, and which blocks movement to the fully inserted position of cassettes mis-presented upside down or with sides inverted;

said sensing mechanism comprising:

a cassette-type-determining sensing lever pivotally mounted on one side of the loading mechanism for movement from an initial position;

a slider member having an initial position in the cassette path and movable longitudinally along the cassette path with a cassette upon insertion of the cassette into the housing, the slider member being blocked against longitudinal movement by the sensing lever, when the sensing lever is in its initial position, to prevent a cassette being moved along the cassette path to the fully inserted position; and an element which senses presence of a discontinuity on an external surface of either the first or the second type cassette, when correctly presented, and is operable to pivot the sensing lever from its initial position and allow longitudinal movement of the slider member with the respective cassette to the fully inserted position.

2. A loading mechanism according to claim 1 wherein the element is a stud carried by the sensing lever which engages the long side with windows of an inserted cassette, the sensing lever is mounted to swing around a fixed axis in a plane parallel to the cassette inserting plane from its initial position, and the slider member has an abutment which restrains the sensing lever in an initial position wherein the stud is held laterally of the cassette path within the support housing.

3. A loading mechanism according to claim 1 wherein the longitudinal movement of the slider member, responsive to insertion of a cassette in the support housing, is produced by engagement by a leading end of the cassette with a tab integral with the slider member.

4. A loading mechanism according to claim 2 wherein the slider member has a second abutment which is engaged by the sensing lever and blocks the slider member against longitudinal movement, when the sensing lever is in its initial position.

5. A loading mechanism according to claim 2 wherein the stud cooperates with a distinguishing discontinuity in the form of a crevice provided in the long side of the first type cassette next to a shutter which selectively opens and closes the windows, when a first type cassette which is correctly presented is inserted in the housing, which allows the sensing lever to swing from its initial position to a position clear of the slider member and allows longitudinal movement of the slider member.

6. A loading mechanism according to claim 5 wherein, absence of a crevice, when a cassette of a first type is inserted in the housing, prevents the sensing lever from swinging from its initial position in which it blocks longitudinal movement of the slider member, which represents that a first type cassette is mis-presented.

7. A loading mechanism according to claim 1 wherein the element is a cam carried by the sensing lever which is engageable by a distinguishing discontinuity in the form of a thickened region proximate the one long side of a second type cassette, when correctly presented and inserted in the housing, such engagement of the cam being operable to pivot the sensing lever around a fixed axis in a plane perpendicular to the cassette inserting plane to a position clear of the slider member which allows longitudinal movement of the slider member.

8. A loading mechanism according to claim 1 further including resilient means for urging the sensing lever to its initial position.

9. A loading mechanism according to claim 1 including resilient members connecting the slider member and a cassette within the housing during movement to the fully inserted position, and during movement from the fully inserted position to a fully ejected position in which the cassette is resiliently held by the resilient members with a substantial portion of the cassette projecting from the housing.

10. A loading mechanism according to claim 1 further including first and second switches actuated to first and second states respectively indicating the first and second type cassettes responsive to movements of the sensing lever and slider member from their initial positions.

11. A cassette loading mechanism operable with first and second type similar size parallelepiped cassettes enclosing an information carrier and having opposite faces, long sides and narrow ends; the first type having: a one long side with windows for head access, a normally closed longitudinally slidable shutter which selectively opens and closes the windows, a long side crevice next to the shutter, and reel drive access openings in only one face; the second type having: one long side with windows for head access, reel drive access openings in both opposite faces, and a thickened region proximate said one long side;

said cassette loading mechanism comprising:
a support housing into which either type cassette may be inserted end-first and which receives and guides either type cassette to move in a longitudinal path in a cassette inserting plane to a fully inserted position, when correctly presented and inserted wherein the one long side of either cassette and the faces with reel drive access openings are located to receive a corresponding tape reading head and reel drive system;
a sensing mechanism which distinguishes between the types of cassettes to select tape recording/playback head and reel drive systems corresponding, respectively, to the first and second type cassettes responsive to movement of either type cassette to the fully inserted position, when correctly presented, and which blocks movement to the fully inserted position of cassettes mis-presented upside down or with sides inverted;
said sensing mechanism comprising:
a cassette-type-determining and shutter-actuating sensing lever mounted on one side of the loading mechanism extending generally parallel to the path of cassette movement, the sensing lever being supported for pivotal movement from an initial position in planes parallel to and perpendicular to the cassette inserting plane;
a slider member carried adjacent the sensing lever in the cassette path and mounted for longitudinal movement along the cassette path upon engagement by a leading end of a cassette which is inserted into the support members, the slider member being longitudinally aligned with the sensing lever, when the sensing lever is in its initial position, and blocked against movement by the sensing lever, when the sensing lever is in its initial position, to prevent a cassette being moved along the cassette path to the fully inserted position;
means responsive to movement along the housing by the thickened region of a second type cassette, when correctly presented, for pivoting the sensing lever from its initial position in the plane perpendicular to the cassette inserting plane clear of the slider member, which allows movement of the slider member and the second type cassette to be moved to the fully inserted position; and
means carried into the long side crevice next to the shutter in a first type cassette, when correctly presented, which allows the sensing lever to pivot from its initial position in the plane parallel to the cassette inserting plane clear of the slider member, and allows movement of the slider member and the first type cassette to be moved to the fully inserted position, the shutter being moved to open the windows during such movement of the first type cassette to the fully inserted position.

12. A cassette loading mechanism operable with first and second type similar size parallelepiped cassettes enclosing an information carrier and having opposite faces, long sides and narrow ends; the first type having: one long side with windows for head access, a normally closed slidable shutter which selectively opens and closes the windows, a crevice next to the shutter, and reel access openings in only one face; the second type having: one long side with windows for head access, reel access openings in both faces, and a thickened region proximate said one long side;

said cassette loading mechanism comprising:
a support housing into which either type cassette may be inserted end-first and which receives and guides either type cassette to move in a longitudinal path in a cassette inserting plane to a full inserted position, when correctly presented and inserted wherein the one long side of either type cassette with windows and the faces with reel drive access openings are located to receive a tape recording/playback head and reel drive system corresponding to the type of cassette;
a sensing mechanism which distinguishes between the types of cassettes, when correctly presented, and which blocks movement to the fully inserted position of cassettes mis-presented upside down or with sides inverted;
said sensing mechanism comprising:
a cassette-type-determining and shutter-actuating sensing lever pivotally mounted on one side of the loading mechanism extending generally parallel to the path of cassette movement, the sensing lever being supported for pivotal movement in planes parallel and perpendicular to the cassette inserting plane;
resilient members biasing the sensing lever to an initial position;
a slider member carried adjacent the sensing lever in the cassette path and mounted for longitudinal movement along the cassette path upon engagement by a leading end of a cassette which is inserted into the support members, the slider member providing an abutment longitudinally aligned with the sensing lever and being blocked against longitudinal movement by the sensing lever, when the sensing lever is in its initial position, to prevent a cassette being moved along the cassette path to the fully inserted position;

a cam element carried by the sensing lever in the path of the thickened region of a second type cassette, when correctly presented, and which, when engaged thereby, moves the sensing lever in the perpendicular plane from its initial position clear of the abutment on the slider member against force applied by a resilient member, which allows longitudinal movement of the slider member and the second type cassette to be moved to the fully inserted position; and an actuating element carried by the sensing lever and movable into the crevice next to the shutter in a first type cassette, when correctly presented, which allows the sensing lever to pivot in the plane parallel to the inserting plane from its initial position clear of the abutment on the slider member due to force applied by a resilient member, and allows longitudinal movement of the slider member and the first type cassette to be moved to the fully inserted position, the shutter being opened by the actuating element during such movement of the first type cassette to the fully inserted position.

13. A cassette loading mechanism operable with first and second type similar size parallelepiped cassettes enclosing an information carrier and having long sides, one long side having windows, narrow ends, and an external surface having a distinguishing discontinuity, said cassette loading mechanism comprising:

a support housing into which either type cassette may be inserted end-first and which receives and guides either type cassette to move in a longitudinal path in a cassette inserting plane to a fully inserted position, when correctly presented and inserted wherein the one long side of either type cassette with windows is located to receive a tape recording/playback head system corresponding to the type of cassette, a sensing mechanism which distinguishes between the types of cassette, when correctly presented, and which blocks movement to the fully inserted position of cassettes mis-presented;

said sensing mechanism including a cassette-type-sensing lever movable from an initial position to a first or a second position corresponding respectively to the type of cassette responsive to engagement with a surface discontinuity distinguishing a cassette correctly presented and inserted in the housing; and a movable slider member which moves along with a cassette inserted in the housing and is normally blocked against movement by the sensing lever and prevents mispresented cassettes from being moved to the fully inserted position, and which is allowed to move with a correctly presented and inserted cassette to the fully inserted position when the sensing lever is moved to either of its first or second positions upon engagement with a surface discontinuity distinguishing the type of cassette.

14. A cassette loading mechanism operable with parallelepiped cassettes enclosing an information carrier and having a distinguishing discontinuity on an external surface, said cassette loading mechanism comprising:

a support housing into which a cassette may be inserted and which receives and guides a cassette to move to a fully inserted position, when correctly presented, wherein the discontinuity is located to be sensed as the cassette is inserted into the support housing;

a sensing mechanism including:

a slider, movable with respect to the support housing, which is actuated by and moves with a cassette when the cassette is inserted into the support housing; and a sensing element which blocks the slider against movement when a cassette which has no discontinuity is inserted, thereby indicating a mis-presented cassette and preventing its insertion to the fully inserted position, and which allows the slider to move upon sensing presence of the discontinuity when a cassette which has the discontinuity is inserted, thereby indicating a correctly presented cassette and allowing its insertion to the fully inserted position.

15. A cassette loading mechanism according to claim 14 operable with parallelepiped cassettes having a distinguishing discontinuity in the form of a crevice provided in one long side, and wherein the sensing element enters the crevice to sense the discontinuity in an inserted cassette.

16. A loading mechanism according to claim 14 operable with parallelepiped cassettes having a distinguishing discontinuity in the form of a thickened region proximate one long side, and wherein the sensing element is moved by the thickened region to sense the discontinuity in an inserted cassette.

17. A cassette loading mechanism according to claim 14 wherein the sensing element comprises a lever pivotally mounted on one side of the loading mechanism for movement in perpendicular planes.

18. A cassette loading mechanism according to claim 17 operable with first and second type parallelepiped cassettes: the first type having a distinguishing discontinuity in the form of a crevice in one long side; the second type having a distinguishing discontinuity in the form of a thickened region proximate one long side; wherein the support housing guides either type cassette to move in a longitudinal path in a cassette inserting plane to a fully inserted position, the slider member is movable from an initial position in a longitudinal direction generally parallel to the cassette path, and the sensing lever is located on one side of the loading mechanism extending generally parallel to the cassette path and supported for pivotal movement from an initial position in perpendicular planes parallel and perpendicular to the cassette inserting plane responsive to engagement, respectively, with the crevice in a first type cassette and the thickened region in a second type cassette, when inserted in the support housing of the loading mechanism.

19. A cassette loading mechanism according to claim 17 further including first and second switches actuated to first and second states respectively indicating the first and second type cassettes responsive to movements of the sensing lever and slider from their initial positions.

20. A cassette loading mechanism according to claim 14 operable with first and second type parallelepiped cassettes having different external surface discontinuities wherein the sensing lever is pivotally mounted for movement in perpendicular planes, respectively, upon sensing the surface discontinuities of the first and second type cassettes.

* * * * *